US011215134B2

(12) United States Patent
Petitjean et al.

(10) Patent No.: US 11,215,134 B2
(45) Date of Patent: Jan. 4, 2022

(54) METHOD OF OPERATING AN INTERNAL COMBUSTION ENGINE

(71) Applicant: Liebherr-Components Deggendorf GmbH, Deggendorf (DE)

(72) Inventors: Brice Petitjean, Marsens (CH); Francois Masson, Villars sur Glane (CH); Josef Aspelmayr, Schwertberg (AT)

(73) Assignee: Liebherr-Components Deggendorf GmbH, Deggendorf (DE)

( * ) Notice: Subject to any disclaimer, the term of this patent is extended or adjusted under 35 U.S.C. 154(b) by 67 days.

(21) Appl. No.: 16/522,631

(22) Filed: Jul. 25, 2019

(65) Prior Publication Data
US 2020/0032732 A1 Jan. 30, 2020

(30) Foreign Application Priority Data
Jul. 25, 2018 (CH) ..................................... 0093618

(51) Int. Cl.
| F02D 41/26 | (2006.01) |
| F02D 41/40 | (2006.01) |
| F02M 55/02 | (2006.01) |
| F02M 63/02 | (2006.01) |

(52) U.S. Cl.
CPC .......... *F02D 41/263* (2013.01); *F02D 41/40* (2013.01); *F02M 55/025* (2013.01); *F02M 63/0225* (2013.01); *F02D 2200/0602* (2013.01); *F02D 2200/0618* (2013.01)

(58) Field of Classification Search
CPC ................. F02D 41/263; F02D 41/40; F02D 2200/0602; F02D 2200/0618; F02D 41/107; F02D 2200/0614; F02D 2200/0616; F02D 41/401; F02D 41/3836; F02D 41/14; F02D 1/06; F02D 41/3809; F02M 55/025;
(Continued)

(56) References Cited

U.S. PATENT DOCUMENTS

| 7,938,101 | B2 | 5/2011 | Cinpinski et al. |
| 8,554,448 | B2 | 10/2013 | Imai et al. |
| 10,012,170 | B2 | 7/2018 | Qiao et al. |

(Continued)

FOREIGN PATENT DOCUMENTS

| DE | 19726756 A1 * | 1/1999 | ......... F02D 41/3809 |
| DE | 10012024 A1 | 9/2001 | |

(Continued)

*Primary Examiner* — Joseph J Dallo
*Assistant Examiner* — Kurt Philip Liethen
(74) *Attorney, Agent, or Firm* — McCoy Russell LLP

(57) ABSTRACT

The present invention discloses a method of operating an internal combustion engine comprising a controllable injector for injecting fuel into a combustion chamber, the injector communicating with a fuel accumulator through which it is supplied with fuel, the method comprising the following steps:
 determining a first pressure value of the pressure in the fuel accumulator on the basis of a first pressure measurement,
 determining a second pressure value of the pressure in the fuel accumulator on the basis of a second pressure measurement carried out after the first pressure measurement, and
 determining an injector opening duration depending on the first and the second pressure value.

17 Claims, 11 Drawing Sheets

(58) Field of Classification Search
CPC .... F02M 63/0225; F02M 45/12; F02M 41/00; Y02T 10/40
See application file for complete search history.

(56) References Cited

U.S. PATENT DOCUMENTS

| | | | | |
|---|---|---|---|---|
| 2007/0044764 | A1* | 3/2007 | Osaki | F02D 41/3845 123/458 |
| 2007/0251506 | A1* | 11/2007 | Li | F02D 41/2464 123/478 |
| 2008/0059039 | A1* | 3/2008 | Nakagawa | F02D 41/2464 701/99 |
| 2011/0313639 | A1* | 12/2011 | Hemmerlein | F02M 63/0225 701/103 |
| 2016/0131012 | A1* | 5/2016 | Prospero | F01N 3/023 60/295 |
| 2016/0138509 | A1* | 5/2016 | Walder | F02M 57/005 73/114.49 |
| 2018/0023502 | A1* | 1/2018 | Dolker | F02D 41/22 123/447 |

FOREIGN PATENT DOCUMENTS

| | | | | |
|---|---|---|---|---|
| DE | 10332213 | B3 | 8/2004 | |
| DE | 10342130 | A1 * | 4/2005 | ......... F02M 63/0225 |
| DE | 10357158 | A1 | 7/2005 | |
| DE | 102006023468 | B3 | 9/2007 | |
| DE | 102010007171 | A1 | 11/2010 | |
| DE | 102010016094 | A1 | 11/2010 | |
| DE | 102016206359 | A1 | 10/2016 | |

* cited by examiner

METHOD OF OPERATING AN INTERNAL COMBUSTION ENGINE

CROSS REFERENCE TO RELATED APPLICATIONS

The present application claims priority to Swiss Patent Application No. 00936/18 entitled "METHOD OF OPERATING AN INTERNAL COMBUSTION ENGINE" filed Jul. 25, 2018. The entire contents of the above-listed application are hereby incorporated by reference for all purpose.

TECHNICAL FIELD

The present invention relates to a method of operating an internal combustion engine comprising a controllable injector for injecting fuel into a combustion chamber, the injector communicating with a fuel accumulator, which may in particular be a pressure accumulator, through which it is supplied with fuel.

BACKGROUND AND SUMMARY

In the case of such a method, the injection quantity depends on the pressure in the fuel accumulator and on the injector opening duration. A change of pressure in the fuel accumulator may therefore lead to an undesirable deviation of the actual injection quantity from the target injection quantity, if the injector opening duration remains unchanged.

DE 103 32 213 A1 therefore suggests to continuously monitor the pressure in the fuel accumulator during injection and to execute an integration via the varying injection rate estimated on the basis of the pressure. The injector is then intended to be closed as soon as the integrated injection quantity has reached the target injection quantity. Although the procedure suggested in DE 103 32 213 A1 theoretically leads to a particularly precise control of the injection quantity, it fails in reality due to the real-time demands to be met by the system, since a normal engine control unit will not be able to execute with the necessary velocity the arithmetic operations suggested there.

Therefore, it is the object of the present invention to provide a method for controlling the injector that takes into account the real-time demands to be met by such a system.

This object is achieved by a method according to claim 1. Preferred embodiments of the present invention are the subject matter of the subclaims.

The present invention comprises a method of operating an internal combustion engine comprising a controllable injector for injecting fuel into a combustion chamber, the injector communicating with a fuel accumulator through which it is supplied with fuel, the method comprising the following steps:
  determining a first pressure value of the pressure in the fuel accumulator on the basis of a first pressure measurement,
  determining a second pressure value of the pressure in the fuel accumulator on the basis of a second pressure measurement carried out after the first pressure measurement, and
  determining an injector opening duration depending on the first and the second pressure value.

Due to this course of action, the first pressure measurement is already carried out comparatively early. As a result, the first pressure value is also available comparatively early and can already be used for subsequent time-consuming steps of the method and/or can be determined with high accuracy. Through the subsequent determination of the second pressure value, a high accuracy will nevertheless be achieved with respect to variations of the pressure in the fuel accumulator occurring after the first pressure measurement.

The injector opening duration may be determined in several substeps, which need not necessarily be executed only after the determination of the second pressure value. On the contrary, at least one substep for determining the injector opening duration is executed on the basis of the first pressure value before the second pressure value is available.

According to a possible embodiment of the present invention, the method additionally comprises the following step:
  specifying a desired injection quantity,
the determination of the injector opening duration being executed depending on the first and the second pressure value and the desired injection quantity. In particular, the injector opening duration is determined depending on the first and the second pressure value, so that the desired injection quantity is achieved.

According to a possible embodiment of the present invention, the method additionally comprises the following step:
  controlling the injector on the basis of the previously determined injector opening duration.
In particular, the previously determined injector opening duration may be used for specifying the moment in time at which the injector closes.

According to a possible embodiment of the present invention, the first pressure measurement is carried out before the injector is opened. This provides sufficient computing time for an accurate evaluation of the pressure sensor signal for determining the first pressure value.

According to a possible embodiment of the present invention, the second pressure measurement is carried out after the injector has been opened. This means that a current pressure value ascertained during the injector opening duration and thus during the injection process will be available in the form of the second pressure value. It follows that, if the pressure in the fuel accumulator changes between the first pressure measurement and the start of the injection process or during the injection process, this change in pressure will nevertheless be taken into account.

The first pressure value and the second pressure value are generated on the basis of the respective sensor signal by means of signal evaluation.

According to a possible embodiment of the present invention, the first and the second pressure value are determined by different evaluation methods. This allows in particular the taking into account of the different demands on the task run time.

Preferably, a second evaluation method used for determining the second pressure value works faster than a first evaluation method used for determining the first pressure value, i.e. it has a shorter task run time and will therefore run faster on the motor control unit.

According to a possible embodiment of the present invention, at least one of the following method steps is carried out for determining the first pressure value, while the determination of the second pressure value is carried out without this step:
  correction of the pressure measurement value with respect to a variation of the supply voltage and/or temperature;
  downsampling;
  digital filtering.

Alternatively or additionally, the determination of the second pressure value may run on the motor control unit with a higher priority than the determination of the first pressure value.

According to a possible embodiment of the present invention, a first injector opening duration is first determined depending on the first pressure value and, when the second pressure value is available, a correction of the first injector opening duration is carried out depending on the second pressure value.

This means that the determination of the second pressure value can take place even later, since it will not be necessary to determine the injector opening duration when the second pressure value is available, but it will suffice to correct an already provisionally determined first injector opening duration.

Hence, the first injector opening duration is preferably determined before the second pressure value is determined and/or before the second pressure measurement is carried out.

According to a possible embodiment of the present invention, the correction of the injector opening duration depends on the desired injection quantity and/or the pressure in the accumulator. In particular, the correction of the first injector opening duration may have incorporated therein the desired injection quantity and/or the pressure, in addition to the second pressure value and/or a pressure difference between the second and a third pressure value.

According to a possible embodiment of the present invention, the determination of a correction value takes place in a plurality of steps, at least one step being already executed before the second pressure value and/or a pressure difference between the second and a third pressure value is/are available.

According to a possible embodiment of the present invention, the correction of the first injector opening duration is effected by means of a characteristic map, which depends on the desired injection quantity and/or the pressure in the accumulator. The characteristic map may be stored in the engine control unit e.g. in the form of a table and/or in the form of a formula relationship.

Preferably, a correction value is read out from a characteristic map for correcting the first injector opening duration on the basis of the first pressure value. This is advantageous insofar as the correction value can already be determined as soon as the first pressure value is available and thus at a comparatively early moment in time.

In particular, the correction value can be read out on the basis of the first pressure value before the second pressure value has been determined.

Preferably, the correction value, after having been read out, is adapted on the basis of the second pressure value. Such an adaptation can be effected in particular by scaling the correction value by means of the second pressure value and/or a pressure difference between the second and a third pressure value.

The correction value stored in the characteristic map may e.g. correspond to a fixedly predetermined pressure difference and may be adapted, if the pressure difference existing between the second and a third pressure value and actually determined by means of the second pressure value deviates from this predetermined pressure difference.

According to an alternative embodiment of the present invention, the second pressure value and/or the pressure difference between the second and a third pressure value is/are, however, used for correcting the first pressure value.

In this case, the injector opening duration is preferably determined on the basis of the corrected pressure value.

According to a possible embodiment of the present invention, the determination of the injector opening duration is carried out depending on a pressure difference between the second pressure value and a third pressure value. Such a pressure difference allows taking into account changes occurring in the pressure in the fuel accumulator between the first and the second pressure measurement.

In particular, the correction of the first injector opening duration as described above may depend on a pressure difference between the second pressure value and a third pressure value.

According to a possible embodiment of the present invention, the first pressure value itself may be used as a third pressure value. However, if different evaluation methods are used for determining the first and the second pressure value, this will be disadvantageous. Therefore, the third pressure value is preferably determined separately from the first pressure value.

According to a possible embodiment of the present invention, the second and the third pressure values are determined by applying the same evaluation method. Any systematic errors occurring in the determination of the pressure values will thus become part of both pressure values in the same way. This will lead to a compensation or to a minor over- or under-compensation when the pressure difference is formed.

Preferably, the third pressure value is determined making use of an evaluation method which has a shorter task run time than the evaluation method used for determining the first pressure value.

Preferably the pressure difference correlates with the change of the pressure in the fuel accumulator between the first pressure measurement and the second pressure measurement. For this, the third pressure value is determined preferably on the basis of the first pressure measurement or a third pressure measurement, which is carried out in close temporal proximity to the first pressure measurement.

According to a first variant, the third pressure value may be determined on the basis of the first pressure measurement. If the first pressure measurement is used for determining the third pressure value, the best correspondence in time between the first and the third pressure value will be obtained. In this case, however, the additional computing time required for evaluation necessitates that the first pressure measurement must be carried out earlier, and this is disadvantageous as regards accuracy.

According to a second variant, the third pressure value may therefore be determined on the basis of a third pressure measurement, i.e. a pressure measurement carried out in addition to the first and the second pressure measurement.

The third pressure measurement may be carried out after the first pressure measurement. In this case, however, the additional computing time required for evaluation necessitates that the first pressure measurement must be carried out earlier, and this is disadvantageous as regards accuracy.

Hence, the third pressure value is preferably determined on the basis of a third pressure measurement, the third pressure measurement being here carried out before the first pressure measurement.

Preferably, the determination of the first pressure value is carried out immediately after the determination of the third pressure value. As a result, the time offset between the first and the third pressure measurement remains comparatively small.

According to a possible first variant of the present invention, the second pressure measurement and/or the determination of the second pressure value is/are carried out at a moment in time which is fixedly predetermined with respect to the moment in time at which the injector opens.

In particular, this moment in time may be fixedly predetermined independently of a desired injection quantity and may therefore not differ from one injection process to the next. This has the advantage of a particularly simple and reliable implementation.

In this case, the moment in time will preferably be predetermined such that, in the case of the shortest possible opening duration, the final value of the injector opening duration will be available just in time to close the injector at the right time.

According to a second variant of the present invention, the second pressure measurement and/or the determination of the second pressure value is/are carried out at a moment in time which is variable with respect to the moment in time at which the injector opens. This means that, in many cases, the second pressure measurement can take place even later.

In particular, the moment in time may be determined depending on a desired injection quantity for the respective opening operation of the injector.

It follows that, if, for example, the injection quantity provided for a second injection process is larger than that for a first injection process, which will lead to a longer injection duration of the injector, the second pressure measurement and/or the determination of the second pressure value will take place, with respect to the moment in time at which the injector opens, at a later moment in time than in the case of the first injection process.

The method according to the present invention is preferably used for an internal combustion engine comprising a common fuel accumulator for a plurality of injectors, which are assigned to different combustion chambers, in particular in an internal combustion engine provided with a common-rail injection system.

According to a possible embodiment of the present invention, the method is used for an internal combustion engine comprising a plurality of injectors, the injector opening duration being determined for each injector individually.

According to a possible embodiment of the present invention, the internal combustion engine comprises a pump for generating a variable target pressure in the fuel accumulator, the target pressure and a desired injection quantity being specified on the basis of engine operating parameters and/or a user input.

In this case, in particular a change in the target pressure and/or an operation of the pump may lead to a significant change of the pressure in the fuel accumulator, which, however, is difficult to coordinate with the operation of the injector. The method according to the present invention nevertheless allows reliable and precise control of the injection quantity.

Preferably, the injector opening duration is determined depending on the desired injection quantity.

In particular, the first injector opening duration may be determined depending on the desired injection quantity and the first pressure value. The correction by means of the second pressure value will then increase the accuracy of the quantity of fuel actually injected.

In addition to the method according to the present invention, the present invention also comprises an engine control software comprising commands for executing a method of the type described hereinbefore. In particular, the engine control software is programmed to automatically execute the method according to the present invention when running on an engine control unit.

The present invention further comprises an internal combustion engine comprising a controllable injector for injecting fuel into a combustion chamber, and a fuel accumulator with which the injector communicates and through which it is supplied with fuel, and further comprising a pressure sensor for measuring the pressure in the fuel accumulator. The internal combustion engine comprises an engine control unit, which is programmed to execute the following steps:
  determining a first pressure value of the pressure in the fuel accumulator on the basis of a first pressure measurement,
  determining a second pressure value of the pressure in the fuel accumulator on the basis of a second pressure measurement carried out after the first pressure measurement, and
  determining an injector opening duration depending on the first and the second pressure value.

According to a preferred embodiment, the engine control unit is programmed to execute the following steps:
  determining a first pressure value of the pressure in the fuel accumulator on the basis of a first pressure measurement and determining a first injector opening duration depending on the first pressure value, and
  determining a second pressure value of the pressure in the fuel accumulator on the basis of a second pressure measurement and correcting the first injector opening duration depending on the second pressure value.

Preferably, the engine control unit communicates with at least one pressure sensor for measuring the pressure in the fuel accumulator and evaluates the signals of this pressure sensor.

In addition, the engine control unit preferably communicates with the injector and controls it. In so doing, the engine control unit especially controls, according to the injector opening duration corrected as disclosed by the present invention, the moments in time at which the injector opens and closes.

The method according to the present invention preferably runs automatically on the engine control unit.

Preferably, the engine control unit is programmed such that it executes the method according to the present invention as described above.

The engine control unit preferably comprises a microprocessor and a non-volatile memory area in which an engine control software is stored. The engine control software is executed by the microprocessor. The engine control unit communicates with sensors and evaluates their signals, and controls actors of the engine and in particular the injectors of the engine.

The internal combustion engine according to the present invention may be a 4-stroke engine. The latter may work according to an Otto process and/or a Diesel process.

The internal combustion engine according to the present invention may be an off-road engine. In particular, the internal combustion engine according to the present invention may be used to drive mobile work machines.

Therefore, the present invention further comprises a mobile work machine with a combustion engine of the type described above.

However, it is also imaginable to use an internal combustion engine according to the present invention in a stationary application, e.g. for driving a generator, just as it is imaginable to use it in arbitrary other applications.

BRIEF DESCRIPTION OF THE DRAWINGS

The present invention will now be described in more detail making reference to embodiments and to drawings, in which.

DETAILED DESCRIPTION OF THE INVENTION

Figure 1:
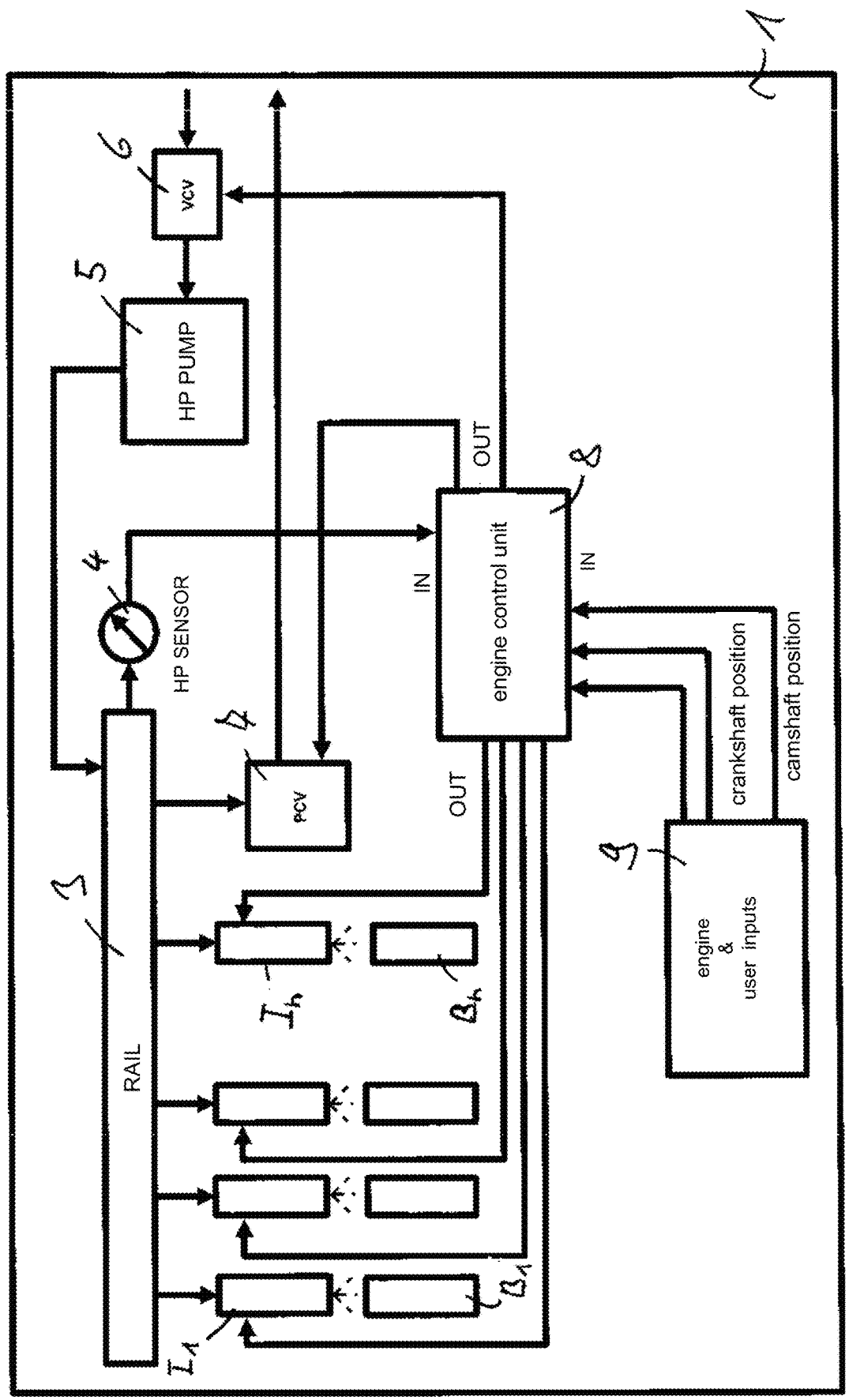
FIG. 1 shows a schematic diagram of an internal combustion engine according to the present invention.

FIG. 1 shows an embodiment of an internal combustion engine 1 according to the present invention. The internal combustion engine comprises a plurality of injectors $I_1$ to $I_n$ for injecting fuel into combustion chambers $B_1$ to $B_n$. The injectors communicate with a common pressure accumulator 3, which supplies them with fuel. The present embodiment is therefore a common-rail injection system. Hence, the pressure accumulator will also be referred to as a rail in the following. The method according to the present invention may, however, also be used with other injection systems, and in particular also in cases where the pressure accumulator supplies only one injector with fuel. The pressure accumulator serves to temporarily store the fuel, with which it supplies the injector or the injectors, and represents therefore a fuel accumulator.

The pressure in the pressure accumulator 3 is measured via a pressure sensor 4. In addition, a high-pressure pump 5 is provided, which generates a target pressure in the pressure accumulator 3. The high-pressure pump is supplied with fuel via a volume control valve 6 and pumps this fuel into the pressure accumulator 3. The pressure accumulator 3 is connected to the tank via a pressure control valve 7 and a return line. The pressure control valve 7 operates as a pressure relief valve and opens when the target pressure has been reached.

The signals of the pressure sensor 4 are evaluated by an engine control unit 8. The engine control unit controls the injectors $I_1$ to $I_n$, the high-pressure pump 5 and the valves 6 and 7. In addition, the engine control system receives values from other sensors 9 as input signals, in particular the crankshaft position and the camshaft position, as well as user inputs such as the desired engine speed.

Figure 2:
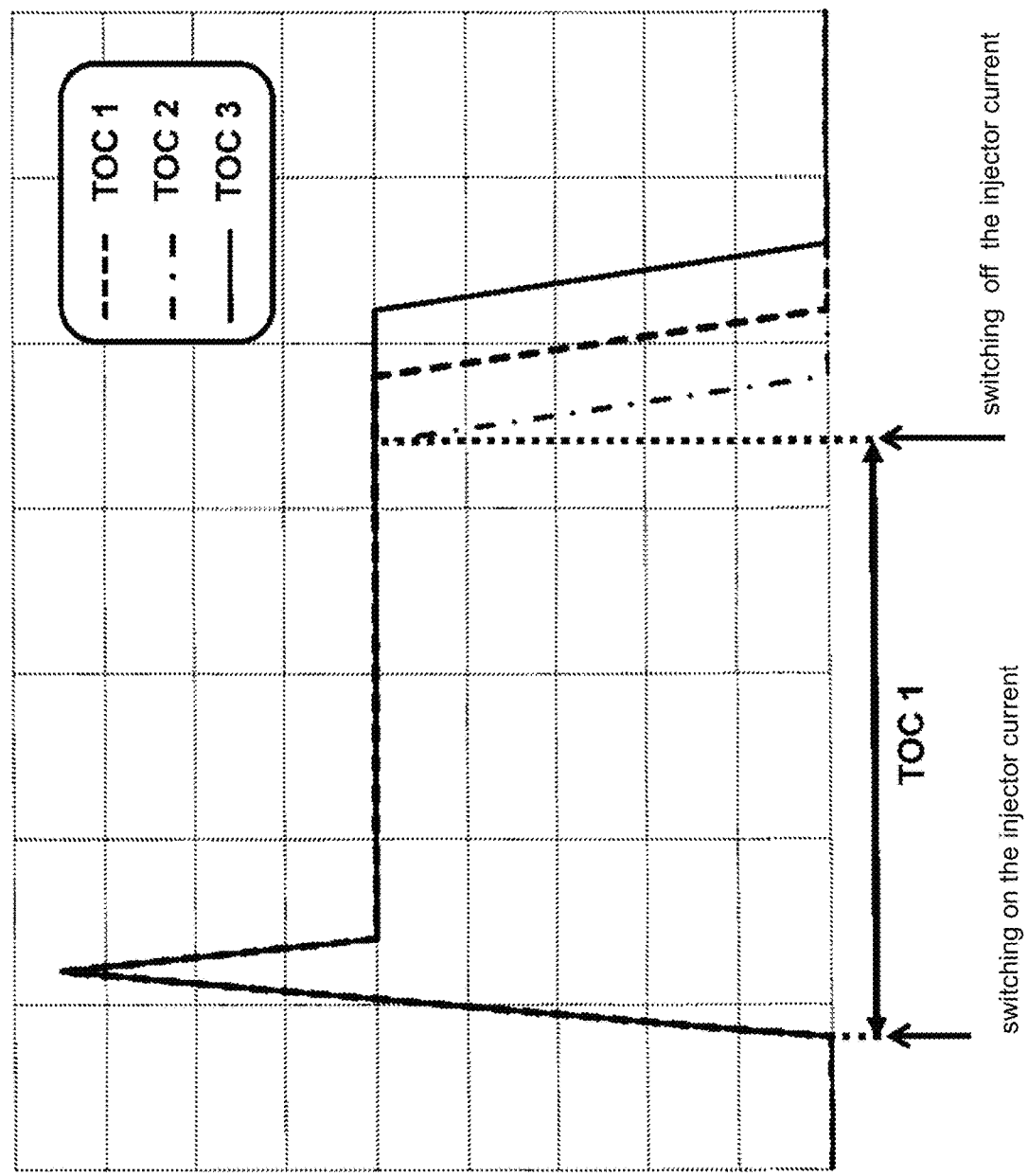
FIG. 2 shows a diagram showing the injector current as a function of time during injection processes with different injector opening durations (TOC)
Figure 3:
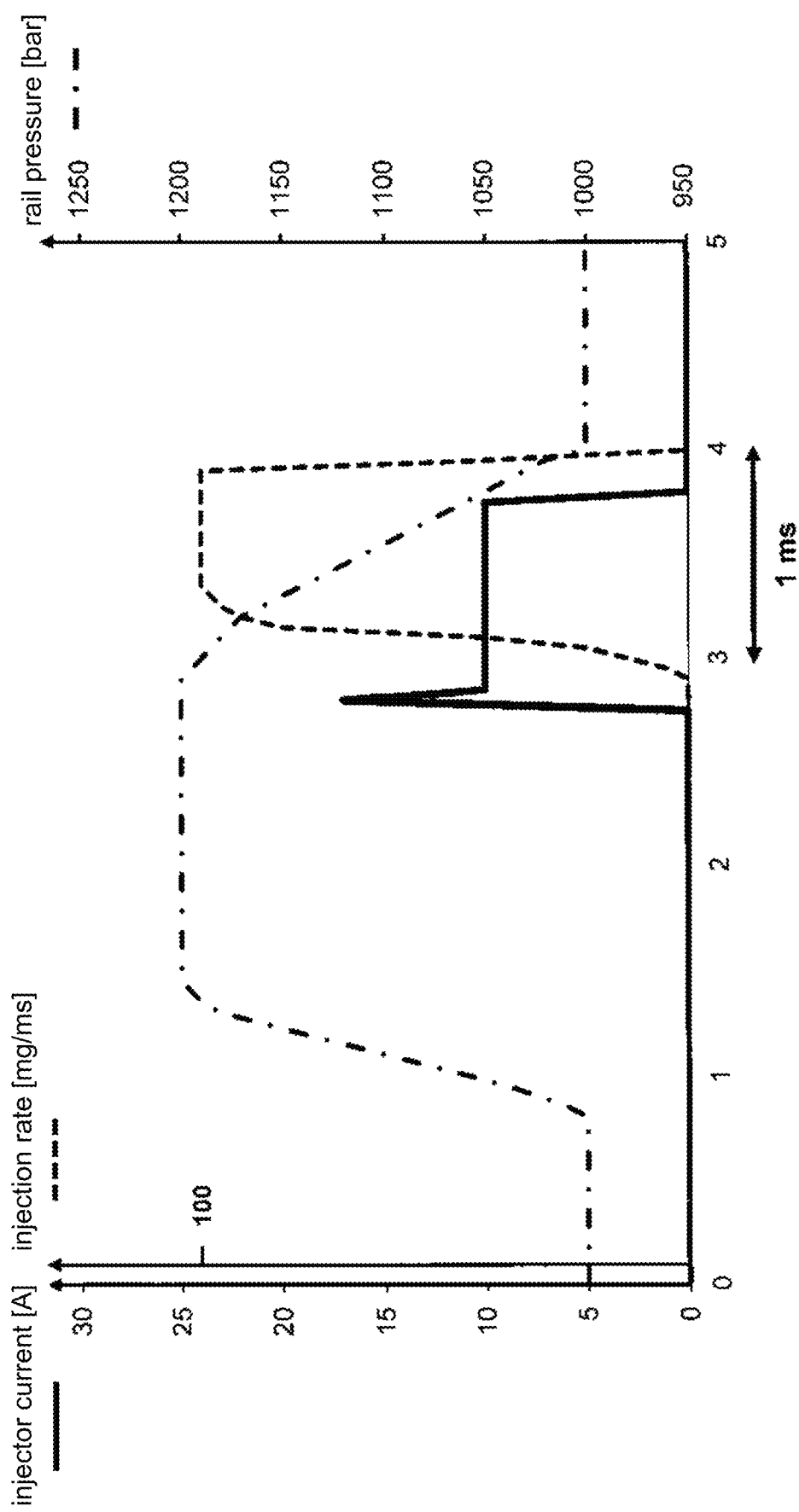
FIG. 3 shows a diagram showing the injector current and the injection rate as a function of time during an injection process as well as an exemplary pressure curve in the pressure accumulator.

Making reference to FIGS. 2 and 3, the general relations between the control of an injector $I_1$ to $I_n$, the injection rate or injection quantity and the pressure in the pressure accumulator 3 will first be shown.

During an injection process, regardless of whether it is the main injection, a pre- or a post-injection, it is not possible to directly monitor whether the target quantity of fuel to be injected is complied with. Hence, regulating the fuel injection rate on the basis of individual cycles is not possible and a control is subjected to inaccuracies. Observing the target injection quantity is only possible in a collective extending over a plurality of ignition processes.

The rail pressure is determined by an engine operating strategy implemented in the engine control unit. The direct physical influence exerted on the rail pressure by the engine speed and the engine torque is, however, small. Pressure build-up in the rail is decoupled from the injection process. The volumetric capacity of a rail exceeds the maximum quantity of an injection process by far. Therefore, the rail pressure remains reasonably constant even during an injection process, provided, of course, that the engine operating strategy intends the rail pressure to remain constant during the observation period.

In the common-rail system according to FIG. 1, which is taken into account for explaining the present invention, the fuel quantity supplied during an injection process can be specified via the rail pressure and the injection duration, i.e. the period of time for which the injector is open. In transient operation of the internal combustion engine, i.e. in the event of strong speed and torque variations occurring for a short period of time, the rail pressure can only be adapted with a certain delay to the new operating point provided for by the engine operating strategy, whereas the injection duration can quickly be adapted to the new operating situation.

If, for example, the rail pressure is still significantly below its new target value when a sudden load variation acting on the internal combustion engine occurs, the intended total fuel quantity of the injection process taking place at the moment in question can nevertheless be provided by increasing the injection duration, i.e. by extending the period of time for which the injector is open.

Furthermore, the start of an injection process, i.e. the moment in time or the crankshaft angle at which the injector is opened, can be specified. Specifying the start of injection in an advantageous manner, depending on the respective operating situation, is of great importance for the best possible operation of the internal combustion engine and is a central aspect of the injection strategy within the engine software.

Under an idealization and the great simplification that the value of the rail pressure is exactly known and that its value changes during the injection process neither locally nor in terms of time, the injection duration could be adapted precisely and the exact target injection quantity could be achieved in this way. In reality, there are numerous effects influencing the actual injection quantity. These are, without any claim to comprehensiveness, the following ones:

a) The discharge of fuel from the open injector results in a decrease in pressure.
b) During an injection process it may happen that the high-pressure pump supplies fuel to the rail.
c) The detection range of the pressure sensor and the blind hole in the interior of the injector nozzle are separated in space. Apart from a stationary case, which does not exist in an operated internal combustion engine, run times between the pressure sensor and the injector occur in the fuel system and, consequently, different instantaneous pressure values.
d) Pump pulsations
e) The fast opening and closing of the injector causes pressure fluctuations.
f) The actual start of injection and the end of injection occur with a certain delay in time to the control of the injector.
g) Ageing of the injectors
h) Temperature dependency of the fuel density Studies on the extent of these impairments have shown that the possibly occurring overlaps in time between the injection and the supply of fuel through the high-pressure pump result in comparatively large deviations between the target quantity and the actual quantity of an injection. These overlaps are not reproducible. Depending on the load change, the time profile of the rail pressure will differ. Depending on the condition of the internal combustion engine, the engine operating strategy will specify different injection starts with respect to the crankshaft angle. However, even with a stationary operating point of the internal combustion engine, a synchronous operation between the high-pressure pump and the injections will not exist in the vast majority of cases.

Although the duration of energization of the injector is clearly defined by the engine operating strategy, this predetermination is based on input values that are no longer valid during the period of execution by an actor. With an increase in the dynamics demanded from the internal combustion engine, there will be an increasing compensation potential that can be exploited with the invention.

The present invention therefore serves to comply more precisely with the target injection quantity for each individual injection process. On the basis of FIGS. 2 to 4, the time periods taken into account in this respect, which lie in the microsecond range, will be explained in more detail.

FIG. 3 shows a simplified and idealized injection process on the basis of the time curves of the rail pressure [bar], the injector current [A] and injection rate [mg/ms]. At the beginning of the observation period, which is set as a moment in time t=0 for reasons of simplification, the injector current is I=0 A and, consequently, the injection rate is 0. The initially existing rail pressure of 1000 bar is increased by supplying fuel via the high-pressure pump. This supply of fuel starts at a moment in time slightly less than a millisecond after the start of observation. When the rail pressure approaches 1200 bar, the high-pressure pump will be reduced in performance or shut down, so that the rail pressure will maintain this value for the time being. At a moment in time slightly below three milliseconds, the injector is energized. Accordingly, with a certain delay, fuel will start to flow through the nozzle injection holes. When the injector current has ceased to exist, the injector closing process starts, whereupon the flow of fuel is stopped. During the fuel supply, the rail pressure decreases from initially 1200 bar to 1000 bar. After the rail pressure has decreased to this value and the injector has just closed, the above described sequence of steps is about to begin for the next injector to be actuated according to the engine ignition sequence.

The numerical values specified in the diagram and in the text and the resultant numerical ratios are only based on the order of magnitude of the values of real systems. For example, the times indicated are directly dependent on the crankshaft speed and may vary many times over, depending on the operating situation. The time curves shown are simplified and idealized to provide the simplest possible explanation.

FIG. 2 shows three time curves of the injector current. For the sake of clarity, this is a simplified representation. With regard to the temporal dimension of injector energization, the depicted edge steepnesses are smaller than those occurring in reality. If a current threshold value is exceeded, the injector will open. If the current falls below a threshold value, the injector will close. With respect to the diagram, the switching on of the three current flows takes place at the same point on the abscissa. As can be seen, the injector current is switched off after different switch-on durations (TOC 2<TOC 1<TOC 3). TOC means time of current. This refers to the duration of the energization of an injector during an injection process. In a simplified and idealized view, the TOC value corresponds to the fuel injection time and is therefore equated with the injector opening duration within the framework of the invention to be explained here. Due to the response times of real systems, the TOC value is closely related to the fuel injection time; this also applies to the rising edge of the injector current at the start of injection and the falling edge of the injector current, which leads to the value 0, at the end of injection.

On condition that a rail pressure of equal height exists in each of the three cases (p1=p2=p3), the largest quantity of fuel is supplied to the combustion chamber during the injection process in which the injector current is switched on longest, i.e. the three associated TOC values are at their maximum. Likewise, at a higher rail pressure p, the injector current can be switched off after a respective shorter duration, thus achieving a reproducibility of the injected fuel quantity. In the case of a lower rail pressure, the TOC can, of course, be increased, so as to allow again a reproducibility of the injected fuel quantity.

The diagram in FIG. 2 could thus illustrate the three scenarios following hereinafter.

Case 1: For the upcoming injection process, the rail pressure p1 is at its target value specified by the engine operating strategy. The target value of the switch-on duration of the injector current having the magnitude TOC 1 results from the engine operating strategy.

Case 2: The rail pressure is above its target value. In order to ensure that the predetermined total fuel quantity will be supplied to the combustion chamber during the upcoming injection, the injector will have to be energized for a shorter period of time (TOC 2<TOC 1).

Case 3: The rail pressure is below its target value. In order to ensure that the predetermined total fuel quantity will be supplied to the combustion chamber during the upcoming injection, the injector will be energized for a longer period of time (TOC 3>TOC 1).

As can be seen, a deviation between the target value and actual value of the rail pressure can, in principle, be compensated for by adapting the duration of energization, so that the target quantity of supplied fuel intended for the injection process can be complied with. It goes without saying that the value of the duration of energization must be known before the earliest possible end of energization, since otherwise the injector would not have been closed in time, if the rail pressure target value had been exceeded significantly, and, as a result, an injection of an excessive quantity of fuel would be unavoidable.

Prior to using the function for determining the injector opening duration and the TOC, as disclosed by the present invention with respect to the respective next injection process, the injection angle in relation to the crankshaft and camshaft angular positions [0° to 720°] has been specified, depending on certain state variables, e.g. the engine speed, by the engine operating strategy. For determining the injection duration by the engine operating strategy, the actual value of the rail pressure is required as a relevant input variable, namely as a digital signal, which is to be processed taking as a basis the raw signal of the sensor.

In order to accomplish a reliable conformity between the actually existing physical rail pressure and the digital measurement value, signal processing comprising various individual steps is required.

Until a reliable rail pressure value satisfying the demands is available to the engine operating strategy, a few milliseconds may already have elapsed. The speed-torque operating point of the internal combustion engine has a significant influence on the moment in time at which the rail pressure value must be available to the engine operating strategy. Preference is given to exactly the moment in time at which, making use of this value, the calculation of the end of injection has been finished precisely at the moment at which it would still be possible to realize an end of injection required for observing the shortest possible duration of the injection periods to be taken into account.

Figure 4:
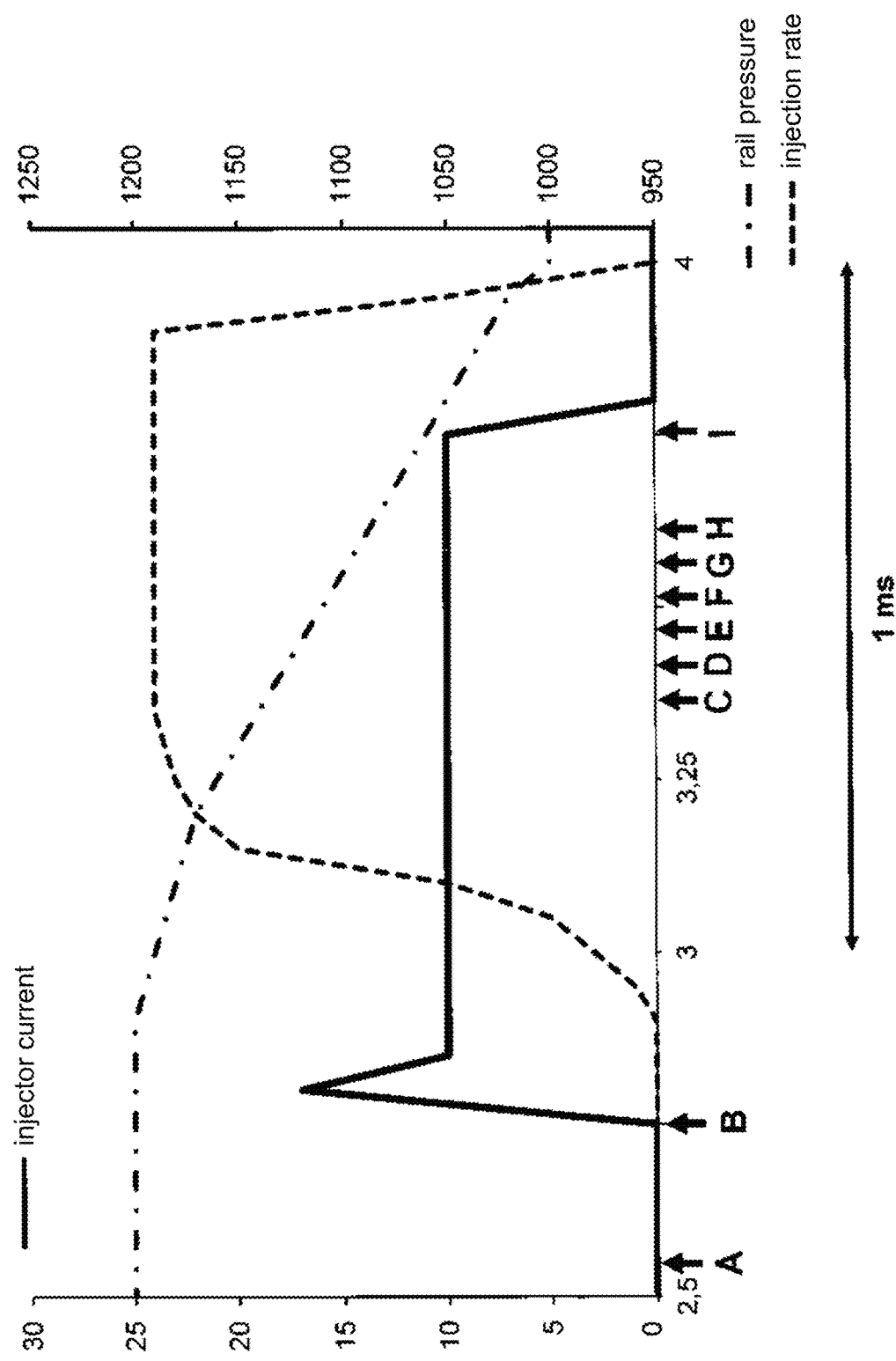
FIG. 4 shows a diagram, which also shows the injector current and the injection rate as a function of time during an injection process as well as an exemplary pressure curve in the pressure accumulator, and which has depicted therein moments in time A to I that are relevant according to the present invention.

FIG. 4 shows a detail of the curves shown in FIG. 3 within the period of time in which the injector is energized and fuel is thus fed through the injection holes. The moments in time identified by the letters are to be understood as qualitative indications and serve to explain the sequence of process steps in the text following hereinafter.

Since the total fuel quantity of the upcoming injection and the start of injection have already been specified by the engine control software in advance, the rail pressure value must be available thereto at a defined moment in time A at the latest. As can be seen from the text following hereinafter, it will be advantageous to set the moment in time A to the latest possible moment in time. Depending on the respective common-rail system, the moment in time A will be specified differently, but it will always be within a time interval in the range of the switch-on time of injector energization B.

On the basis of this rail pressure value available at the moment in time A, the duration of the injector energization TOC and thus also the switch-off time of the injector energization are determined. The latter is the moment in time I in the diagram. The moment in time H marked in the diagram is the earliest switch-off time of injector energization to be taken into account. In order to ensure that the injector current can be switched off in good time, when the relevant conditions prevail —the existence of a particularly high rail pressure and the requirement to supply a particularly small quantity of fuel for the immediately upcoming injection—the moment in time A must not be too late. (Such a constellation exists, for example, in the case of an upcoming pre-injection followed by a main injection with high fuel requirements existing).

The change in rail pressure occurring during the injection process, which shows a decrease from about 1200 bar to 1000 bar in the diagram used to illustrate the process, is a significant disadvantage, since the calculated moment in time at which the injector current is to be switched off, and is switched off in a prior art system is, in the final analysis, based on an incorrect specification, which is why, in the given example, the actual amount of fuel injection is smaller than the target amount. Likewise, during an injection process, the actual amount of fuel injected may be higher than the target amount, in the event that the high-pressure pump supplies fuel to the rail during an ongoing fuel injection process.

Although a high-pressure pump is driven directly by the internal combustion engine via a power take-off, the factor for the transmission ratio, which is indeed a fixed transmission ratio, is a factor exhibiting a comparatively large common multiple of two, since, on the one hand, the high-pressure pump should not be operated at unnecessarily high speeds so as to limit friction losses and the resultant wear. On the other hand, the transmission ratio must be sufficiently high, so that the high-pressure pump can have a sufficiently high fuel delivery rate at any crankshaft speed. (Due to its widespread use, a 4-stroke internal combustion engine is taken as a basis.) If the transmission ratio were e.g. 1:7, the period duration for the value pair (angular position of the crankshaft and angular position of the high-pressure pump) would be 34 revolutions in the case of a 4-stroke internal combustion engine. Due to a long period duration for the value pair of said angular positions, the injection quantity cannot easily be rendered uniform via parameters that are fixedly implemented in the engine control software, not even in the case of a stationarily operated internal combustion engine.

In dynamic applications, such rendering uniform through parameters is not possible under any circumstances, since, in this case, the deviation between the target value and the actual value of the rail pressure is not only dependent on the value pair of the above-mentioned angular positions, but is also influenced by constantly changing target injection quantities. In addition, the angular position of the start of injection is subject to the respective speed-torque operating point of the internal combustion engine. The speed-related delivery rate of a high-pressure pump can, moreover, be adjusted variably for reasons of efficiency. In short, as regards the changes in rail pressure during the successive injection processes, there is no periodicity at all in a dynamically operated internal combustion engine.

In may therefore be stated in summary that the calculation of the duration of injector energization is based on an incorrect specification, which is why the target quantity of fuel injection is missed. As mentioned above, the delivery rate of the high-pressure pump is adjustable, but this only allows adaptation to a collective of several injection processes, whereas a readjustment of the rail pressure for a single immediately upcoming injection is not possible.

The invention therefore provides a compensation method which can be added to the engine operating strategy in the form of additional software and which, making use of existing sensors and actors, leads to a reduction in the deviation between the target value and the actual value of the injection quantity with respect to individual injections.

When the compensation method according to the present invention is used as a supplement to the injection system control corresponding to the prior art, the processed rail pressure value must already be available as the first pressure value at a slightly earlier moment in time A than in the case of a prior art system, since, before the injector current is switched off, some additional software functions explained hereinafter must be executed.

According to the prior art, an already final calculation of the injector current switch-off time is carried out based on the rail pressure value available at the moment in time A.

According to the present invention, however, a first, provisional injector opening duration and thus a provisional moment in time for switching off the injector current is, according to a first embodiment, calculated based on the first rail pressure value available at a moment in time A. This value must be available at a moment in time C (cf. FIG. 4). According to a second embodiment, however, only the first rail pressure value is determined at the moment in time A, without first determining an injector opening duration.

At a moment in time D, which is precisely defined as well, a processed, updated second rail pressure value must be available. As regards the processing of the second rail pressure value, a short task run time is given a much higher priority than the accuracy of the absolute value, other than in the case of the rail pressure value available at the first moment in time A. At the moment in time E, the difference dp between the two read-in rail pressure values is available. At the moment in time F, a correction value calculated from the existing data is available.

At the moment in time G, the definitely specified switch-off time of the injector current is available.

For the sake of clarity, it should again be pointed out that, according to the first embodiment described in detail hereinafter, the second rail pressure value ascertained at the moment in time D is not used as a basis for a complete recalculation of the injector opening duration and thus of the injector current switch-off time, but for a calculation of a correction value which is used for determining a second, final injector opening duration and thus a final switch-off time I, taking into account the previously calculated first injector opening duration and thus the provisional switch-off time.

According to a second embodiment, however, the second pressure value, which is available at the moment in time D, is used for correcting the first pressure value, and only then is the injector opening duration calculated from the corrected pressure value.

The processing of the first rail pressure value available at the moment in time A primarily aims at a high degree of accuracy, i.e. the highest possible correspondence between the actually existing physical rail pressure and the digital value ascertained therefrom, whereas the duration of signal processing is of secondary importance. With the second rail pressure value available at the moment in time D, the speed of signal processing is of greater importance.

It turned out that an omission of certain processing steps of signal processing for the processed first rail pressure value to be transferred to the engine control software at the moment in time A leads to a significantly higher variation of the actual injection quantities in relation to the target quantities, although the period of signal sampling relevant for this can take place in a later period of time and the period of measurement value acquisition thus approaches the period of injection more closely. However, for the second rail pressure value to be transferred to the engine control software at the moment in time D for calculating the correction value K, it turned out that a targeted omission of certain processing steps of signal processing and the thus possible later signal sampling leads to a correction value K, the use of which reduces the deviation between the actual injection quantity and the target injection quantity.

A sequential sequence of preferred processing steps executed for signal processing for the first rail pressure value available at the moment in time A is listed below:

sampling of the sensor signal (sample-and-hold)
analog-to-digital conversion
reading the digital input variable into the software
correction of the pressure signal due to a deviation between the target value and the actual value of the sensor supply voltage
averaging
additional digital filtering
downsampling In the signal processing of the second rail pressure value available at the moment in time D, however, the following processing steps are preferably omitted:

correction of the pressure signal due to a deviation between the target value and the actual value of the sensor supply voltage
additional digital filtering
downsampling The other processing steps, however, can be performed in the same way as for the first pressure value.

In order allow the advantage of faster signal evaluation to be exploited, the signal-sampling period of time must take place in a late period of time; ideally around the period of time which just still allows the digital second rail pressure value to be available at the moment in time D.

According to a preferred embodiment, it is not the first rail pressure value, which has previously been processed with particularly great effort and which is available at the moment in time A, that is used for calculating the rail pressure value difference dp required for determining the correction value K, but a third rail pressure value, which is ascertained by a processing that is similar to and preferably identical with the processing on which the second rail pressure value read-in at the moment in time D is based.

It is possible to ascertain the two values quantifying the rail pressure before the start of injection, i.e. the first and the third rail pressure, in a common signal sampling process. This would be advantageous, on the one hand, because two digital values would then be obtained, which would only differ—as desired—with respect to their signal processing mode. On the other hand, in this case, signal sampling would have to be carried out earlier by the task run time required for the additional signal processing.

The fundamentally existing possibility of separating the signal samplings with which the rail pressure values are to be quantified before injection and of carrying out the third rail pressure value with the fast processing subsequent to the two signal samplings is disadvantageous.

The remaining possibility of separating the signal samplings with which the rail pressure values are to be quantified before injection and of having already ascertained the third rail pressure value with the fast processing before the start of signal sampling for generating the first rail pressure value, the processing of which requires great effort, has the advantage that the time interval between the last-mentioned signal sampling and the injection will not be increased still further.

The advantage of this preferred embodiment is to be seen in that the calculated pressure difference dp is based on two pressure values which are largely subject to the same disturbances. As a result, there is higher conformity between the difference of the physically existing rail pressures and the digital value that is calculated for calculating the correction value K.

A simple example of this is the thermally induced drift of the supply voltage of the pressure sensor. For determining a precise absolute value, it will be useful to compensate for this disturbance or to execute a correction calculation for the corruption caused by this disturbance. For a pressure difference, the corruption will be much smaller, if both pressure values are subject to this disturbance than if a correction calculation is executed for only one of the two pressure values.

Figure 5:
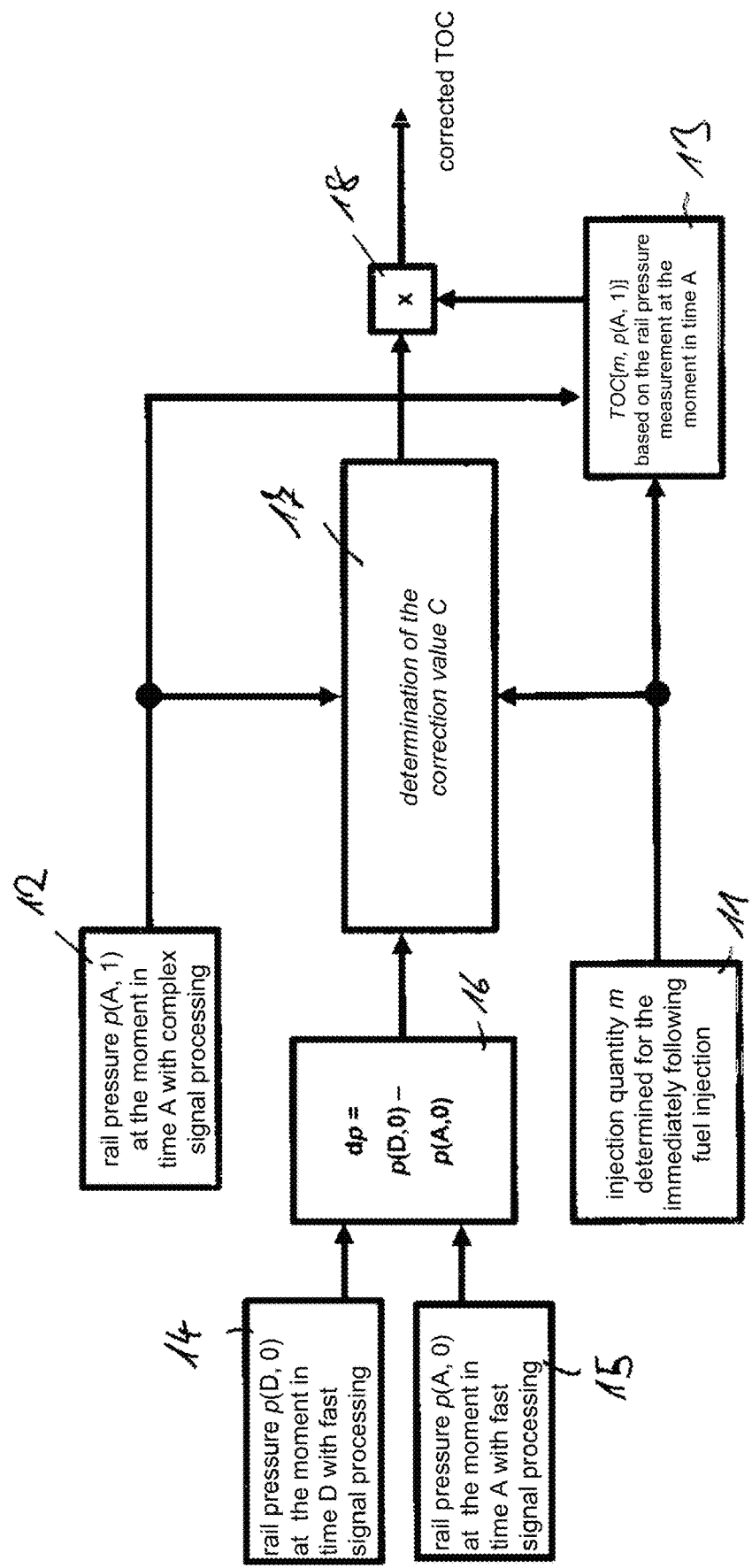
FIG. 5 shows a block diagram of a first embodiment of a method according to the present invention.

In the following, a survey of the qualitatively recorded moments in time for the individual method steps will be given once more:
- A: availability of the processed first rail pressure value (priority on the accuracy of the absolute value)
- B: start of injector energization
- C: availability of the provisionally specified moment in time of injector current switch-off
- D: availability of the processed second rail pressure value (priority on short task run time to allow late signal sampling)
- E: availability of the pressure difference dp
- F: availability of the correction value K
- G: availability of the relevant moment in time for injector current switch-off
- H: earliest possible moment in time at which the injector current can actually be switched off according to the relevant specification.
- I: switching off the injector current as defined at the moment in time G FIG. 5 shows an abstracted block diagram concerning the first example embodiment of the present invention in the above described preferred specific embodiment.

The function for determining the TOC value first takes over, in block 11, the fuel target quantity for the subsequent injection from the engine control strategy, and determines, in block 12, the first pressure value of the rail pressure by means of complex signal processing. In block 13, a first TOC value is calculated using the relevant input variables of the target fuel quantity of the subsequent injection and the precise first value of the rail pressure that precedes in time the start of injection as closely as possible.

In the case of the method according to the present invention, the first TOC ascertained in this way is only a provisionally specified value. The second TOC value actually used to energize the injector is specified according to the present invention by a further function, referred to hereinafter as correction function 17. This correction function 17 generates a correction value, in particular in the form of a correction factor, by means of which the first TOC value in block 18 is corrected so as to provide the final second TOC value.

The correction function 17 exhibits a dependence on a second pressure value of a renewed later, i.e. updated, rail pressure measurement 14, which does preferably not take place before the injection.

In the present embodiment, this renewed rail pressure measurement 14 has no influence on the provisionally calculated first TOC value, but exerts, via the correction function 17, its influence on the second TOC value to be finally specified. Therefore, it is not necessary to execute the entire injection-determining part of the engine control software with the updated second rail pressure value.

The second pressure value is incorporated into the correction function 17 in the form of a pressure difference dp. To this end, a third pressure value is ascertained in block 15 immediately before the moment in time A at which the first pressure value is ascertained, the third pressure value being processed in the same way as the second pressure value. In block 16, the pressure difference between the second and the third pressure value is formed and transferred to the correction function 17.

In the present embodiment, the correction function 17 further exhibits a dependence on the first rail pressure value, which is of decisive importance for specifying the provisional first TOC value. In addition, the correction function may be dependent on the already specified target fuel quantity of the subsequent injection.

In order to allow the updated second rail pressure measurement to be carried out as late as possible, i.e. as closely as possible to the earliest possible switch-off time of the injector current, the processing of the resultant updated second rail pressure value must—as has been explained in detail—have the lowest possible task run time and the correction function must be configured such that the sum of the task run times of its processing and the correction calculation are as short as possible. (This formulation with the deliberately chosen term "task run time" implies that the maximum required computing time is as short as possible).

Figure 6:
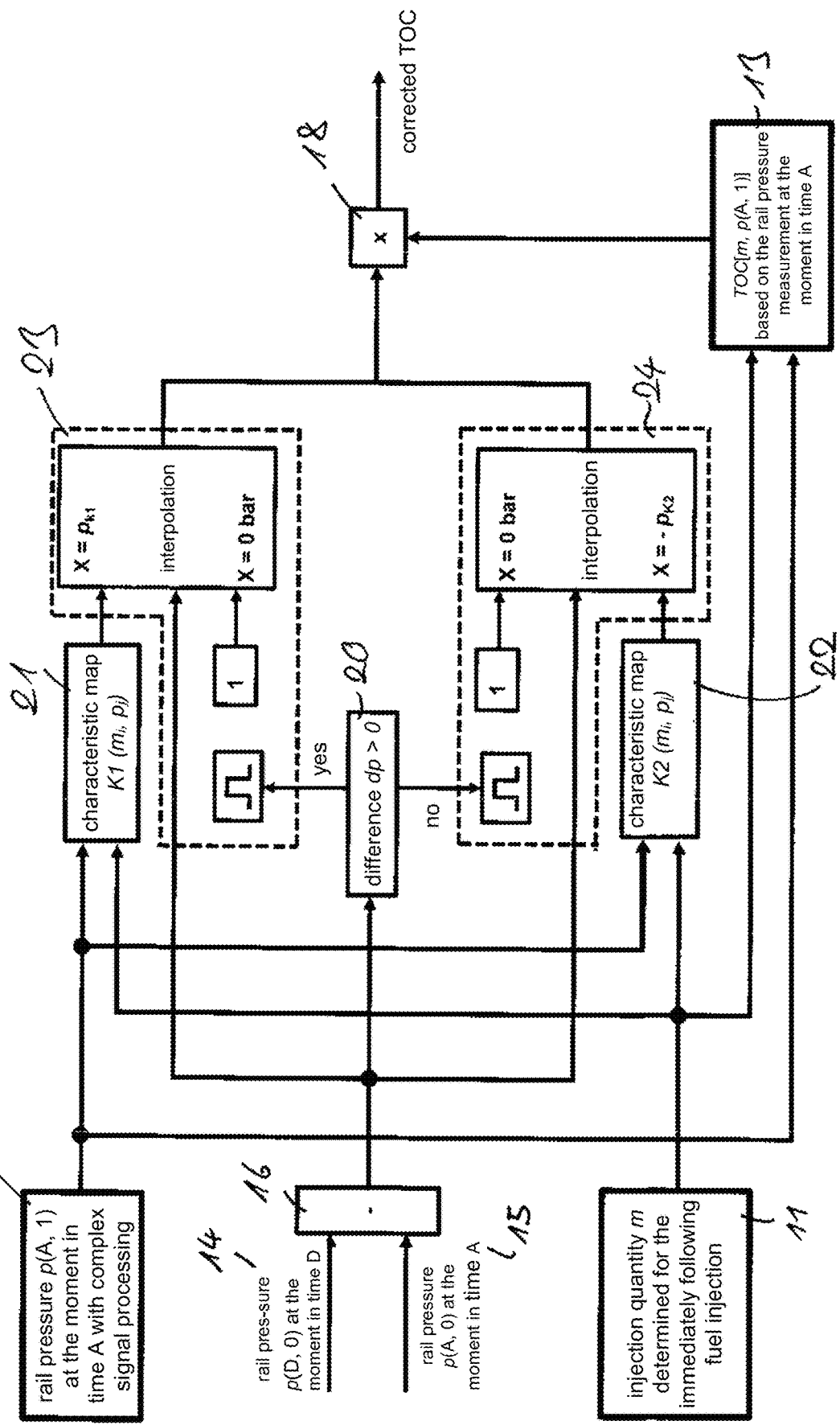
FIG. 6 shows a detailed block diagram of the embodiment of a method according to the present invention as shown in FIG. 5.

FIG. 6 shows the flowchart which has already been shown in FIG. 5, supplemented by a possible implementation of a correction function 17 optimized with regard to the task run time. As regards the other functions and blocks, reference is therefore first made to the above description of FIG. 5.

In the present embodiment, the TOC value, which is relevant for the energization, is ascertained in block 18 by multiplying the previously calculated provisional first TOC value by a correction value determined by the correction function. A correction value of 1 therefore corresponds to no change.

The correction function 17 has a case differentiation 20. The decision criterion depends on the updated second rail pressure value, which is available at the moment in time D. Therefore, the case differentiation 20 can only be resolved comparatively late.

A characteristic map K1, K2 is stored in both paths of the case differentiation. The two input variables of both characteristic maps are the first rail pressure value, which is available at the moment in time A and which has been measured comparatively early, and the target value of the injection quantity for the immediately following fuel injection, said target value being available even more early. Therefore, both characteristic maps K1 and K2 are read out in blocks 23 and 24, respectively, prior to the moment in time D at which the second pressure value is available.

For calculating the correction factor, only the initial value of one of the two characteristic maps 21, 22 is required in the final analysis. Since reading out both said maps is preponed, the second rail-pressure measurement value acquisition, i.e. the respective signal sampling for providing the updated second rail pressure value, can be postponed by the duration corresponding to the task run time for reading out a characteristic map.

This principle may, of course, also be applied in the event that the case differentiation comprises more than two cases or that no case differentiation is made. It goes without saying that this principle may also be applied, if a calculation rule etc., instead of a characteristic map, has to be processed.

What is characteristic is the strategy that, when the correction factor is being ascertained, part of the calculation routine has already been executed before the updated second value of the rail pressure is available.

In the present embodiment, this is done by reading out a value from a characteristic map K1, K2 on the basis of the first pressure value and the target injection quantity.

The correction factor is then determined by interpolation functions 23, 24, which adapt, on the basis of the pressure difference dp, the value read out from the respective characteristic map. In the present embodiment, the value read from the characteristic map corresponds to a correction factor for a given value $p_{k1}$ or $p_{k2}$ of the pressure difference dp, and is now adapted, in particular by means of interpolation, to the pressure difference actually determined by means of the second and third pressure values.

The interpolation will now be illustrated on the basis of the following example, which is described under the assumption dp≥0. In the assumed example, the target value of the upcoming injection is 150 mg and the first rail pressure available at the moment in time A has the value $p_b$. The resultant initial value of the correction map K1 is preferably determined already before the moment in time D and has the value 1.6 in the given example.

Assuming that the third and second rail pressure values available at the moment in time A and at the moment in time D are equal, i.e. dp=0, the initial value of the correction matrix will not be taken into account. The initial value of block 23, i.e. the correction value, then has the value 1.

Assuming that the variable dp reaches or exceeds a specified threshold value $p_{k1}$, a correction value of 1.6 is obtained. If the threshold value is exceeded, the value read from the characteristic map will therefore be used as the correction value without extrapolation.

Under the assumption that the variable dp has a value between 0 and the threshold value $p_{k1}$, a linear interpolation between the value 1 and the correction map initial value 1.6 is executed. If the variable dp, for example, amounts to 10% of the threshold value $p_{k1}$, the linear interpolation will result in a value of 1.06. In this case study, the provisionally specified TOC value is multiplied by a factor of 1.06.

The threshold values $p_{k1}$, $p_{k2}$ are stored in the parameter set of the engine control unit.

Figure 7:
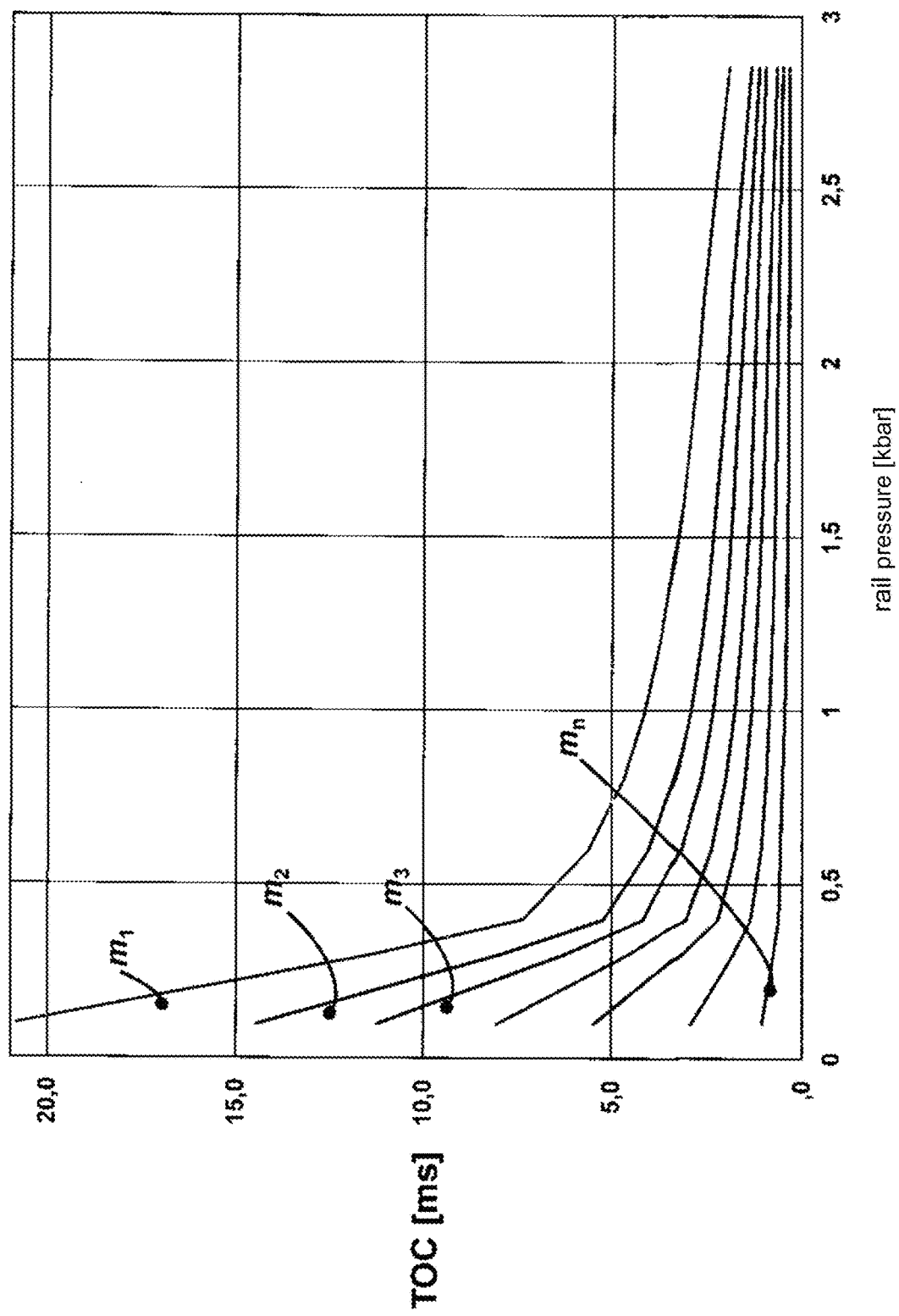
FIG. 7 shows a diagram showing a characteristic map for determining the first injector opening duration as a function of the pressure and the desired injection quantity.

FIG. 7 shows an exemplary injector characteristic map, commonly referred to as a fingerprint, of the type that may be used for calculating the TOC value in block 13. The curves depicted therein show iso-mass lines. The latter refer to the total quantity of fuel supplied to the combustion chamber of an internal combustion engine during an injection period. From the point of view of the engine control unit, the calculated target quantity of the immediately following injection determines the iso-mass line. As soon as the rail pressure value is available, the required TOC value is obtained. The engine control unit comprises for each injector a parameter set including the fingerprint characteristics, the TOC value being thus specified when the input variables are known.

A parameter set that can be used to describe such a characteristic map may e.g. be provided in the form of a value table. A respective column of such a value table has recorded therein the TOC support points for different fuel quantities and a fixedly maintained rail pressure value. The TOC support points for a fixed maintained fuel quantity and for the different rail pressure values are recorded in a respective line.

The characteristic map for determining the TOC value may also be used for calculating a characteristic map K1 and K2, respectively, from which a value is read out for determining the correction factor. To this end, a further parameter set is created whose support points are based on the same fuel quantity values. As regards the rail pressure value, the same pressure differences as in the actual characteristic map still exist between two support points; however, in the second characteristic map the respective pressure entries of all support points are reduced by a respective identical pressure value difference $p_{k2}$. As a result, the values of the TOC entries are higher at respective identical positions in the second characteristic map.

These two characteristic maps can be used for determining therefrom the correction map. The grid between the rail pressure values and the fuel quantities corresponds to that of the characteristic maps for the TOC value. The grid is preferably not an equidistant grid. The reason for this is that the characteristic maps are non-linear and that, on the basis of a skillful selection, a much higher accuracy can therefore be accomplished while maintaining a certain number of support points.

In the correction map, the respective support points refer to the fuel quantities and the rail pressure values, as in the case of the characteristic map for determining the TOC, which has been explained first. In the correction map, the entries at a support point $K(m_i, p_j)$ correspond to the respective quotient of the entries of the first-mentioned characteristic map, the so-called fingerprint map, and the second characteristic map, in which the TOC values at each support point are shifted by a fixed pressure difference $p_{k2}$.

As regards FIG. 6, the correction map K2 used for explanatory purposes covers the case dp<0, i.e. a decrease in rail pressure from the first rail pressure value, which is used for determining the provisional TOC value and which must be available at the moment in time A, and the updated second rail pressure value, which must be available at the moment in time D. In the case of the correction map K1 used to cover the other case, the dividends remain the same as in the case of the correction map K2 in the calculation of the support points, but for the divisors a characteristic map is used, in which the respective entries correspond to the TOC value for a pressure value increased by a constant pressure value difference $p_{k1}$.

Figure 8:
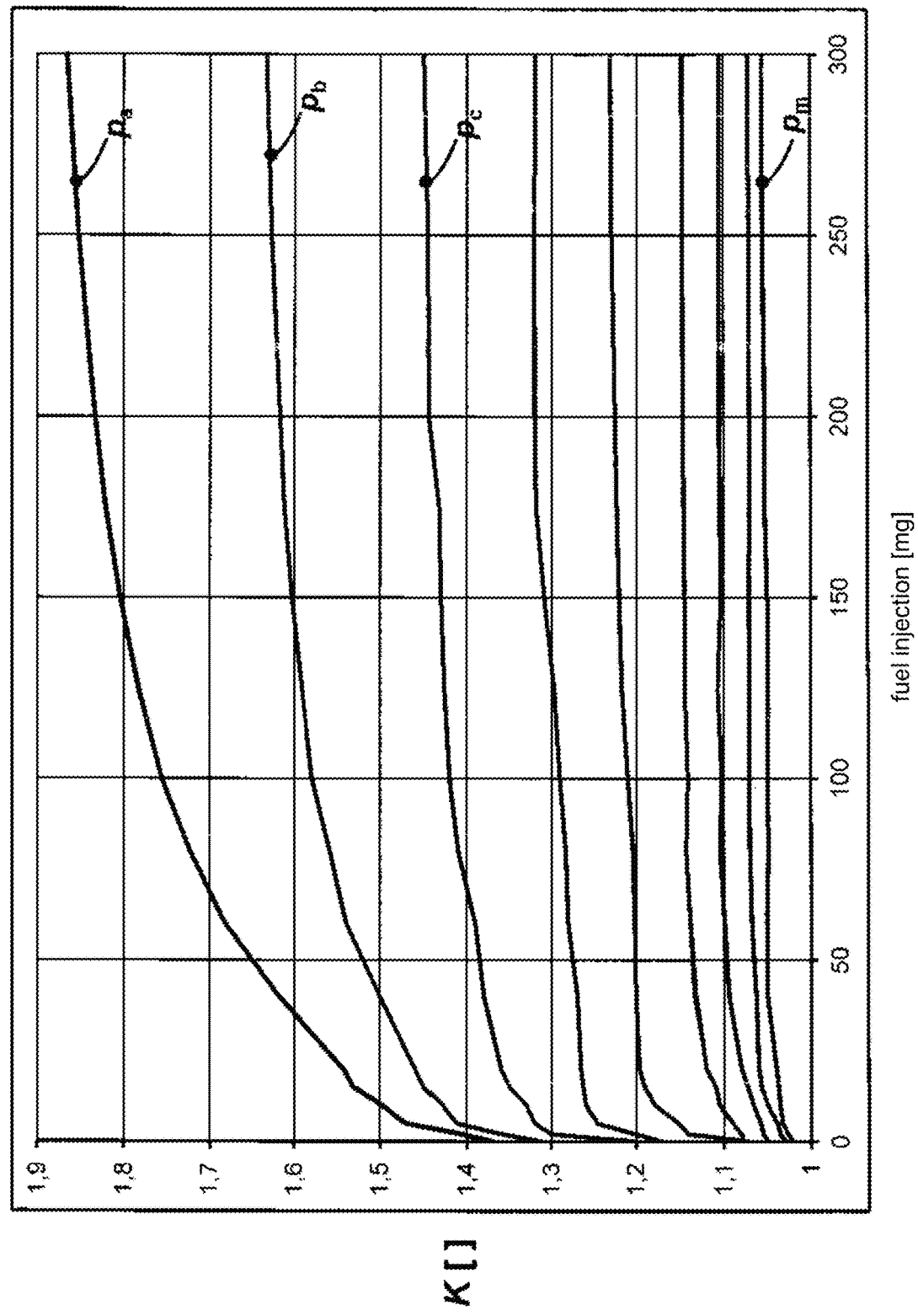
FIG. 8 shows a diagram showing a characteristic map for determining a correction value as a function of the pressure and the desired injection quantity.

FIG. 8 shows an exemplary representation of a correction map K2. Since both the dividend and the divisor are time variables, the initial value of the correction map is dimensionless.

In the case of the first embodiment according to the present invention shown in FIGS. 5 to 8, a first injector opening duration is first determined on the basis of the first pressure value, said first injector opening duration being then corrected on the basis of the second pressure value.

However, the present invention is not limited to such an embodiment.

Figure 9:
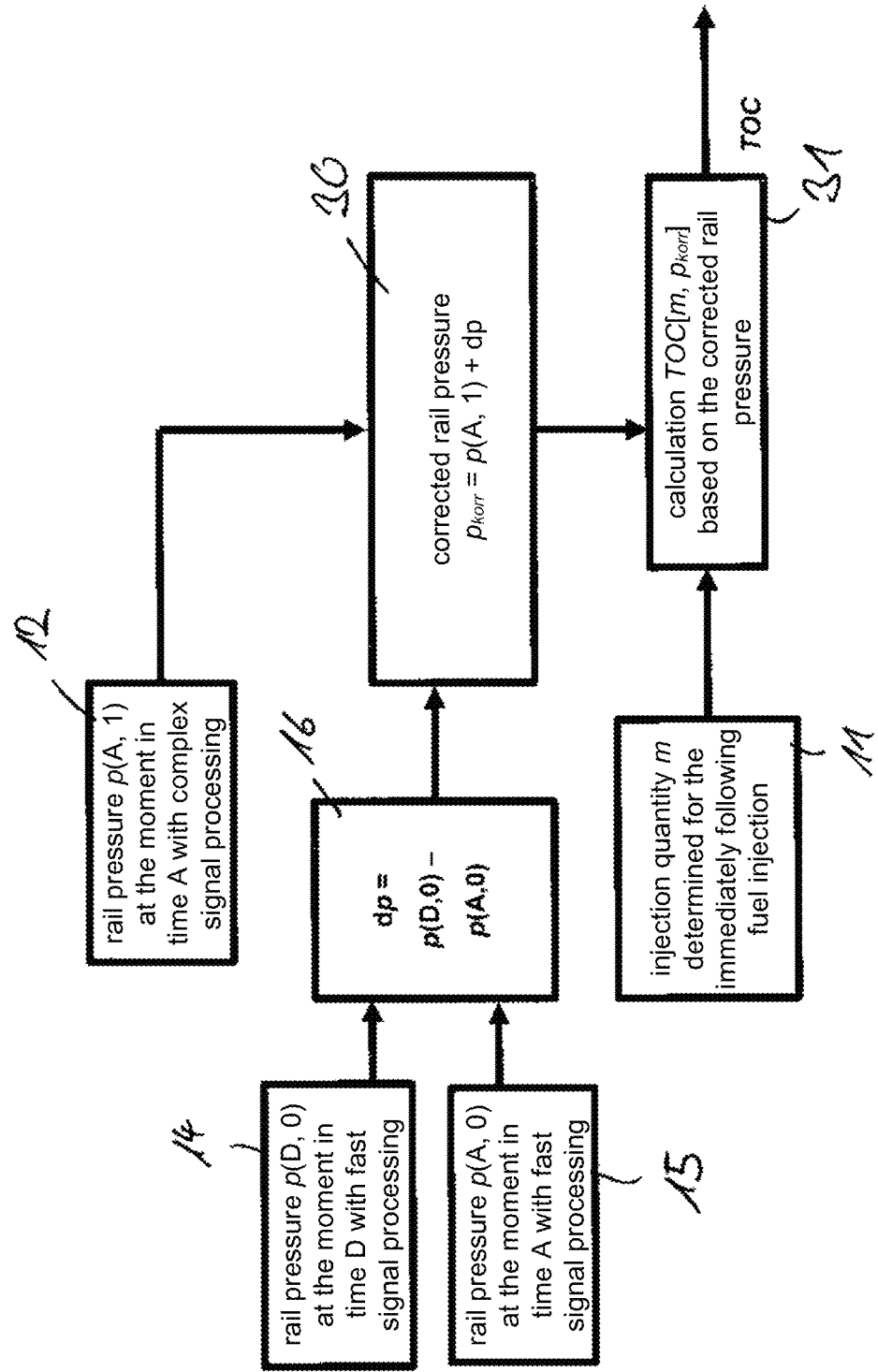
FIG. 9 shows a block diagram of a second embodiment of a method according to the present invention.

FIG. 9 shows in the form of a block diagram a second example of the present invention, in which the second pressure value is not used for correcting a previously determined injector opening duration, but for correcting the first pressure value. Only then, the injector opening duration will be determined on the basis of the corrected pressure value.

Blocks 11, 12 as well as 14 to 16 correspond to the first embodiment shown in FIG. 5, so that reference is made to the above explanations. They provide the first pressure value p(A,1), the injection quantity m and the pressure difference dp.

In the case of the embodiment shown in FIG. 9, a correction function is provided, which corrects in block 30 the first pressure value p(A,1) by the pressure difference dp between the second pressure value p(D,0) and the third pressure value p(A,0), i.e. $p_{korr}$=p(A,1)+dp=p(A,1)+(p(D,0)−p(A,0)). It follows that, in the present embodiment, the pressure difference itself forms the correction value and is added to the first pressure value.

The final injector opening duration TOC is then read, in block 31, directly from the TOC characteristic map by means of the corrected pressure value $p_{korr}$ and the target injection quantity m, i.e. as TOC[m, $p_{korr}$].

The present invention allows a considerable improvement in the accuracy of the fuel quantity actually injected. In the following, this will be proved by series of measurements, which were established with the first example of the present invention.

Figure 10:
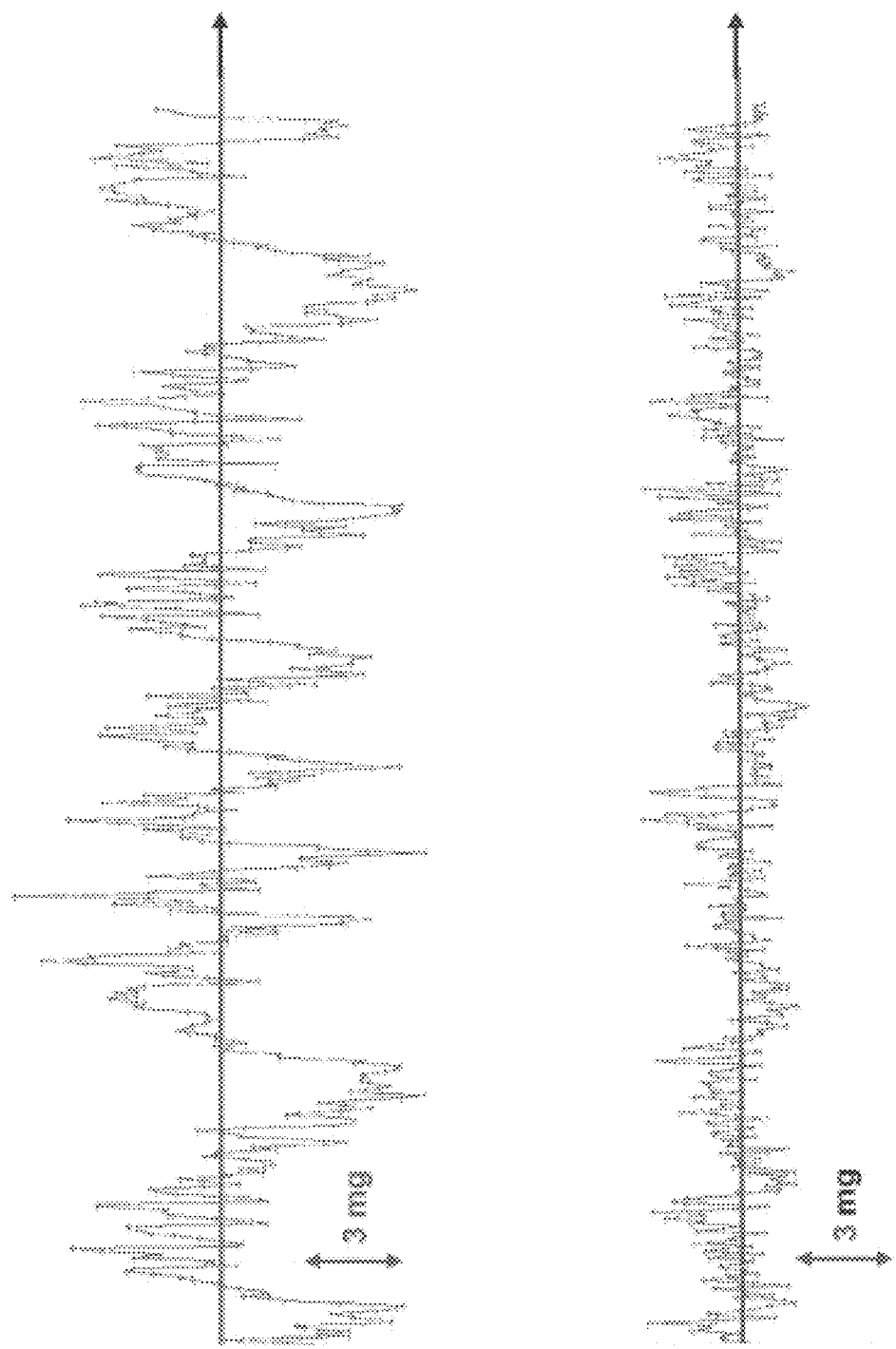
FIG. 10 shows two diagrams showing, for a first test cycle, the deviation between a desired injection quantity and an actual injection quantity, the upper diagram showing an operation according to a prior art method and the lower diagram showing an operation according to the method disclosed by the present invention.

In FIG. 10, both diagrams show, each exemplarily, for an injector the operating behavior of a common-rail system in the case of a stationarily operating internal combustion engine. For high-precision measurement of the respective actual quantities of the individual fuel injections, the series of measurements underlying the diagrams were carried out not in a fired combustion engine, but in a common-rail system operated on a test bench without combustion of the fuel conducted through the injection holes. The environmental conditions relevant for the common-rail system were emulated on the test bench. In the test procedure underlying the diagram, the speed of the high-pressure pump is 1000 revolutions per minute and the target fuel quantity per injection process is 250 mg. The abscissa corresponds to the time and also to the number of the considered injection process. The values of the actually injected fuel quantities are plotted along the ordinate.

In both test series, each injection process documented in the diagrams was triggered in a corresponding manner at the same crankshaft angle. The upper diagram shows the actual values of fuel injection without application of the compensation method according to the present invention. The lower diagram shows the corresponding fuel quantities with use of the compensation method according to the present invention under otherwise identical test conditions.

When the results of the two test series are compared, it is particularly noticeable that the compensation method according to the present invention obviously prevents primarily the particularly strong deviations from the target values. But also in the collective, the deviations have been reduced approximately by a factor between two and three.

Figure 11:
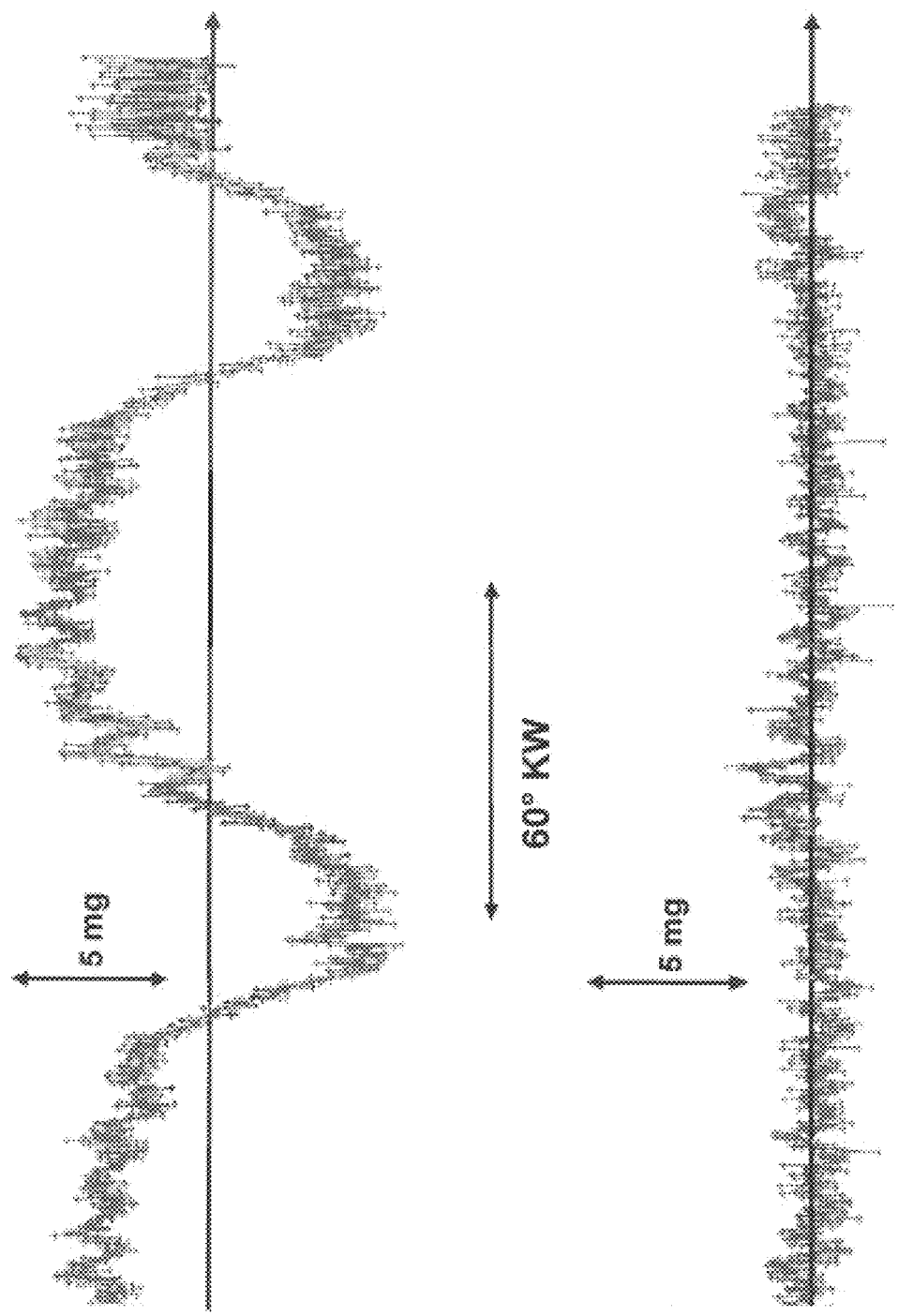
FIG. 11 shows two diagrams showing, for second test cycle, the deviation between a desired injection quantity and an actual injection quantity, the upper diagram showing an operation according to a prior art method and the lower diagram showing an operation according to the method disclosed by the present invention.

In FIG. 11 the two diagrams equally show the operating behavior of a common-rail system. The speed of the high-pressure pump is 1000 revolutions per minute and the target fuel quantity to be supplied is 200 mg per injection process. In contrast to the diagrams shown in the preceding FIG. 10, an intentional variation of the start of injection was executed. As regards the period of time between two injections, an intentional change of the start of injection was slowly caused. In this way, a systematic drift of the actual values can be seen in the upper diagram, which is based on measurement value acquisition without application of the compensation according to the present invention, since, per revolution of its shaft, two piston strokes take place at the high-pressure pump used. The test setup comprised six injectors and the piston strokes of the high-pressure pump and the individual injections took place in synchronization. The diagram shows the injection values for one of the six injectors. Therefore, three revolutions of the high pressure pump shaft take place between two measuring points. Making use of this configuration, the clearly recognizable reproducible disturbance can be exerted on the test setup by changing the start of injection. As can be clearly seen in the lower diagram, this disturbance is effectively attenuated by the present invention.

Particularly high dynamic requirements exist in many applications in the field of mobile work machines. The diesel engines used in this field are classified as so-called off-road engines. The latter are subject to a special exhaust-gas legislation. The emission limits laid down therein are based on a standardized test cycle, the NRTC (Non Road Transient Cycle). By exactly controlling the injection quantity, the present invention allows a substantial improvement also in the field of the exhaust gases produced by the engine.

The invention claimed is:

1. A method of operating an internal combustion engine comprising a controllable injector for injecting fuel into a combustion chamber, the injector communicating with a fuel accumulator through which it is supplied with fuel, the method comprising the following steps:
   determining a first pressure value of pressure in the fuel accumulator on the basis of a first pressure measurement,
   determining a second pressure value of the pressure in the fuel accumulator on the basis of a second pressure measurement carried out after the first pressure measurement, and
   determining an injector opening duration depending on the first and the second pressure values,
   wherein the first and second pressure values are determined by different evaluation methods, wherein a second evaluation method used for determining the second pressure value works faster than a first evaluation method used for determining the first pressure value.

2. The method according to claim 1, wherein the method further comprises a step of controlling the fuel injector on the basis of the determined injector opening duration.

3. The method according to claim 2, wherein at least one of the following method steps is carried out for determining the first pressure value, while a determination of the second pressure value is carried out without this step:
   correction of the pressure measurement value with respect to a variation of supply voltage and/or temperature;
   downsampling; or
   digital filtering.

4. The method according to claim 1, wherein a first injector opening duration is first determined depending on the first pressure value and, when the second pressure value is available, a correction of the first injector opening duration is carried out depending on the second pressure value.

5. The method according to claim 4, wherein the correction of the first injector opening duration depends on a desired injection quantity and/or the pressure in the accumulator and/or is effected by means of a characteristic map, which depends on the desired injection quantity and/or the pressure in the accumulator.

6. The method according to claim 5, wherein, for correcting the first injector opening duration, a correction value is read out from the characteristic map, wherein the correction value is read out on the basis of the first pressure value before the second pressure value has been determined, and wherein, after having been read out, the correction value is adapted on the basis of the second pressure value.

7. The method according to claim 6, wherein the correction value is scaled on the basis of the second pressure value.

8. The method according to claim 4, wherein the determination of the injector opening duration and the correction of the first injector opening duration are carried out depending on a pressure difference between the second pressure value and a third pressure value.

9. The method according to claim 8, wherein the third pressure value is determined on the basis of the first pressure measurement and/or on the basis of a third pressure measurement, wherein the third pressure measurement is carried out in close temporal proximity to the first pressure measurement and/or before the first pressure measurement, the determination of the first pressure value being carried out immediately after the determination of the third pressure value.

10. The method according to claim 8, wherein the second and the third pressure values are determined by applying the same evaluation method.

11. The method according to claim 1, wherein the second pressure measurement and/or the determination of the second pressure value are carried out at a first moment in time which is fixedly predetermined with respect to a moment in time at which the injector opens, the moment in time fixedly predetermined, or wherein the second pressure measurement and/or the determination of the second pressure value are carried out at a second time which is variable with respect to the moment in time at which the injector opens, the second time being determined depending on a desired injection quantity for a respective opening operation of the injector.

12. The method according to claim 11, wherein the moment in time at which the injector opens is fixedly predetermined independently of a desired injection quantity.

13. The method according to claim 1, wherein the fuel accumulator is a common fuel accumulator for a plurality of injectors, each of the plurality of injectors is the controllable injector being assigned to different combustion chambers, and/or wherein the internal combustion engine comprises a plurality of injectors, the injector opening duration being determined for each injector individually.

14. The method according to claim 1, wherein the internal combustion engine comprises a pump for generating a variable target pressure in the fuel accumulator, wherein the target pressure and a desired injection quantity are specified on the basis of engine operating parameters and/or a user input, wherein the injector opening duration is determined depending on the desired injection quantity.

15. A method of operating an internal combustion engine comprising a controllable injector for injecting fuel into a combustion chamber, the injector communicating with a fuel accumulator through which it is supplied with fuel, the method comprising following steps:
determining a first pressure value of pressure in the fuel accumulator on the basis of a first pressure measurement,
determining a second pressure value of the pressure in the fuel accumulator on the basis of a second pressure measurement carried out after the first pressure measurement, and
determining an injector opening duration depending on the first and the second pressure values,
wherein the first pressure measurement is carried out before the injector is opened and the second pressure measurement is carried out after the injector has been opened.

16. An engine control software comprising commands for executing a method of operating an internal combustion engine comprising a controllable injector for injecting fuel into a combustion chamber, the injector communicating with a fuel accumulator through which it is supplied with fuel, the method comprising the following steps:
determining a first pressure value of pressure in the fuel accumulator on the basis of a first pressure measurement,
determining a second pressure value of the pressure in the fuel accumulator on the basis of a second pressure measurement carried out after the first pressure measurement, and
determining an injector opening duration depending on the first and the second pressure values, wherein the first and second pressure values are determined by different evaluation methods, wherein a second evaluation method used for determining the second pressure value works faster than a first evaluation method used for determining the first pressure value and/or wherein the first pressure measurement is carried out before the injector is opened and the second pressure measurement is carried out after the injector has been opened.

17. An internal combustion engine comprising a controllable injector for injecting fuel into a combustion chamber and further comprising a fuel accumulator with which the injector communicates and through which it is supplied with fuel, and still further comprising a pressure sensor for measuring pressure in the fuel accumulator, the internal combustion engine comprising an engine control unit comprising the engine control software according to claim 16.

* * * * *